J. M. BURKE.
Shovel-Plow.
No. 22,013.  Patented Nov. 9, 1858.
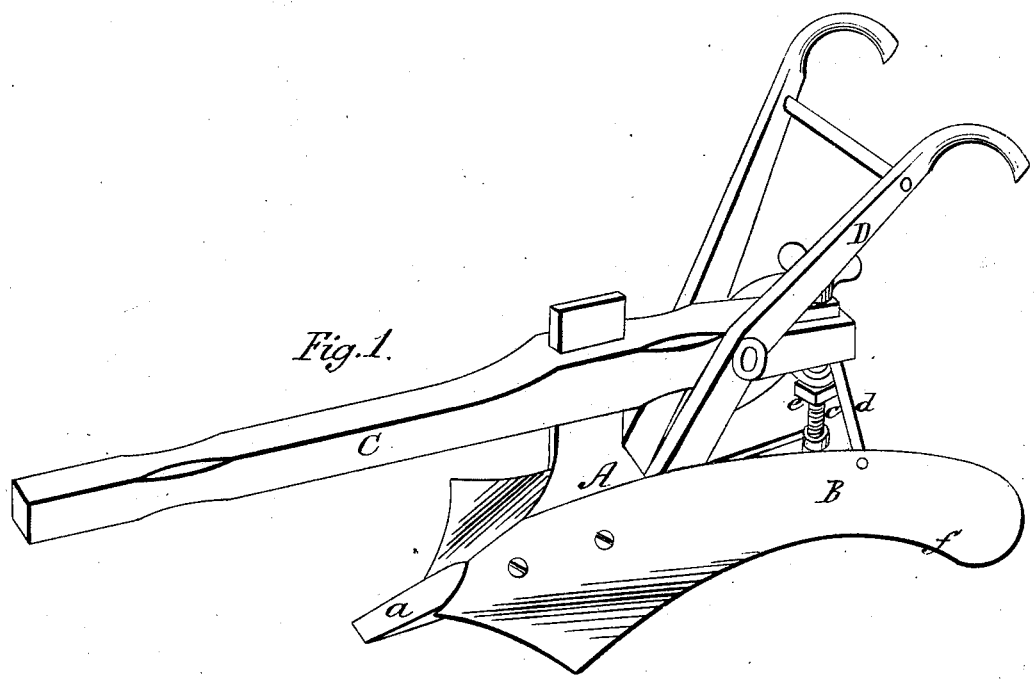
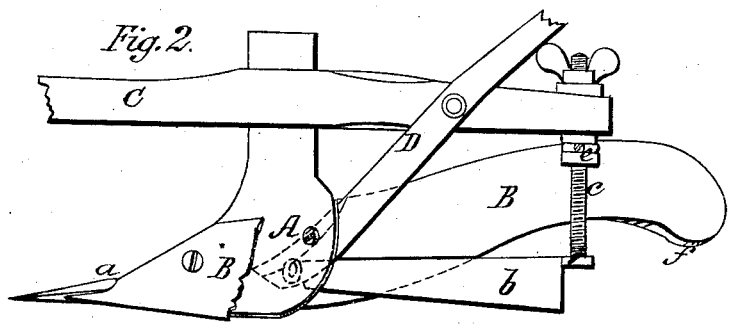
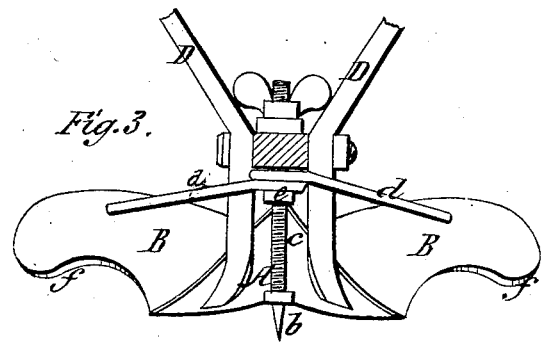

UNITED STATES PATENT OFFICE.

JOHN M. BURKE, OF DANSVILLE, NEW YORK.

IMPROVEMENT IN PLOWS.

Specification forming part of Letters Patent No. 22,013, dated November 9, 1858.

*To all whom it may concern:*

Be it known that I, JOHN M. BURKE, of Dansville, in the county of Livingston and State of New York, have invented certain new and useful Improvements in Plows, of which the following is a full, clear, and exact description, reference being had to the accompanying drawings, forming part of this specification, in which—

Figure 1 represents a perspective view of a double mold-board plow with my improvements. Fig. 2 represents a longitudinal sectional elevation, and Fig. 3 represents a rear elevation, of the same.

My improvements in plows relate to that class known as the "double mold-board plow," which is generally used as a hilling-plow.

My invention consists in depressing the rear end of the mold-board and curving the depression inward in order to give a smooth finish to the surface of the earth that is thrown upward and outward by the mold-board to form the hill.

In the accompanying drawings is represented a plow embracing my improvements, which consists of a bed-plate, A, of cast-iron, of the proper form to receive two thin elastic mold-boards, B, which unite at the ridge of the bed-plate, curve outward, and extend backward, as in ordinary plows. In the present instance both the mold-boards and share are formed in one piece, and a steel point, *a*, divided at the rear end, extends over the point of the share and under the point of the bed-plate, protecting both the plate and the share and preventing them from separating. The rear of bed-plate extends upward between the mold-boards, passes through and connects the plow with the beam C; and handles D are bolted to the side of the beam and riveted at their lower ends to the bed-plate. A knife-shaped guide, *b*, hinged to the inner side of the bed-plate, extends backward in line with the center of the plow, and is connected to the rear end of the beam by a screw-bolt, *c*, so that it can be raised or lowered to adjust the pitch of the point and the distance the plow enters the soil.

The elastic mold-boards are adjusted by means of rods *d*, connected with the rear end, the inner end of the rods being slotted, and the bolt *e* passing through the slot, with a clamping-nut, *e*, which holds the mold-boards in place. A downward projection, *f*, is formed in the rear and lower edge of the mold-boards, which is also curved inward in order to level and finish the top of the hill formed by the earth which is turned up and thrown out by the mold-boards.

It will be seen that in adjusting the mold-boards they bend regularly and uniformly from the bed-plate back without forming irregular ridges or depressions in the face, as heretofore in the previous mode adopted of hinging them at an intermediate point; and that the adjusting-rods form braces which stiffen the mold-boards and prevent them from springing; and that, also, the guide for regulating the depth of the furrows from the form given it cleans itself readily, while at the same time, from its entering the soil, assists in guiding the point of the plow, preventing it from veering, and thus making irregular crooks in the furrows.

Having thus described my improvements in double mold-board plows, what I claim therein as new, and desire to secure by Letters Patent, is—

Depressing and bending inward the rear and lower edge, *f*, of the mold-board, as described, for the purpose set forth.

In testimony whereof I have subscribed my name.

JOHN M. BURKE.

Witnesses:
    F. G. NURES,
    HENRY O. GRIFFETHS.